United States Patent
Brinkley et al.

(10) Patent No.: US 8,590,041 B2
(45) Date of Patent: Nov. 19, 2013

(54) APPLICATION SANDBOXING USING A DYNAMIC OPTIMIZATION FRAMEWORK

(75) Inventors: Matthew D. Brinkley, Portland, OR (US); Ryan Reza Permeh, Trabuco Canyon, CA (US)

(73) Assignee: McAfee, Inc., Santa Clara, CA (US)

( * ) Notice: Subject to any disclaimer, the term of this patent is extended or adjusted under 35 U.S.C. 154(b) by 0 days.

(21) Appl. No.: 13/305,581

(22) Filed: Nov. 28, 2011

(65) Prior Publication Data

US 2013/0139264 A1 May 30, 2013

(51) Int. Cl.
*G06F 12/14* (2006.01)
*G06F 11/30* (2006.01)

(52) U.S. Cl.
USPC .............................................. 726/22; 726/25

(58) Field of Classification Search
None
See application file for complete search history.

(56) References Cited

U.S. PATENT DOCUMENTS

| | | |
|---|---|---|
| 6,865,735 B1 | 3/2005 | Sirer et al. |
| 7,603,704 B2 | 10/2009 | Bruening et al. |
| 7,802,300 B1 | 9/2010 | Liu et al. |
| 2008/0016339 A1 | 1/2008 | Shukla |
| 2008/0016572 A1 | 1/2008 | Burkhardt et al. |
| 2011/0307954 A1* | 12/2011 | Melnik et al. .................. 726/22 |

OTHER PUBLICATIONS

Spector: Automatically Analyzing Shell Code. Borders et al. 23rd Annual Computer Security Applications Conference. IEEE 2007.*
Kiriansky et al.; "Secure Execution Via Program Shepherding"; Laboratory of Computer Science, Massachusetts Institute of Technology; pp. 16, 2002.
Klein, "Google Chrome 3.0 (Beta) Math.random vulnerability"; Trusteer; pp. 12, 2009.
International Search Report and Written Opinion; PCT/US2012/066586; pp. 9, Mar. 4, 2013.

* cited by examiner

*Primary Examiner* — Venkat Perungavoor
(74) *Attorney, Agent, or Firm* — Baker Botts L.L.P.

(57) ABSTRACT

A method for preventing malware attacks may include rewriting instructions that are intercepted from an application launched on an electronic device. The instructions are determined to have attempted to access a sensitive system resource. The rewritten instructions are executed on the electronic device and the results are observed.

28 Claims, 5 Drawing Sheets

APPLICATION SANDBOXING USING A DYNAMIC OPTIMIZATION FRAMEWORK

TECHNICAL FIELD OF THE INVENTION

The present invention relates generally to computer security and malware protection and, more particularly, to application sandboxing using a dynamic optimization framework.

BACKGROUND

Malware infections on computers and other electronic devices are very intrusive and hard to detect and repair. Anti-malware solutions may require matching a signature of malicious code or files against evaluated software to determine that the software is harmful to a computing system. Malware may disguise itself through the use of polymorphic executables wherein malware changes itself to avoid detection by anti-malware solutions. In such case, anti-malware solutions may fail to detect new or morphed malware in a zero-day attack. Malware may include, but is not limited to, spyware, rootkits, password stealers, spam, sources of phishing attacks, sources of denial-of-service-attacks, viruses, loggers, Trojans, adware, or any other digital content that produces unwanted activity.

SUMMARY

In one embodiment, a method for preventing malware attacks includes, launching an application on an electronic device, intercepting one or more instructions from the application, determining whether the one or more instructions includes an attempt to access a sensitive system resource of the electronic device, rewriting the one or more instructions to access the secured system resource of the electronic device, executing the rewritten instructions on the electronic device, and observing the results of the rewritten instructions. The application is attempting to execute the one or more instructions.

In another embodiment, an article of manufacture includes a computer readable medium and computer-executable instructions carried on the computer readable medium. The instructions are readable by a processor. The instructions, when read and executed, cause the processor to launch an application on an electronic device, intercept one or more instructions from the application, determine whether the one or more instructions includes an attempt to access a sensitive system resource of the electronic device, rewrite the one or more instructions to access a secured system resource of the electronic device, execute the rewritten instructions on the electronic device, and observe the results of the rewritten instructions. The application attempts to execute the one or more instructions.

In yet another embodiment, a system for preventing malware attacks includes a processor coupled to a memory and a dynamic optimization framework executed by the process. The dynamic optimization framework is resident within the memory. The dynamic optimization framework is configured to launch an application on an electronic device, intercept one or more instructions from the application, determine whether the one or more instructions includes an attempt to access a sensitive system resource of the electronic device, rewrite the one or more instructions to access a secured system resource of the electronic device, execute the rewritten instructions on the electronic device, and observe the results of the rewritten instructions. The application attempts to execute the one or more instructions.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Figure 1:
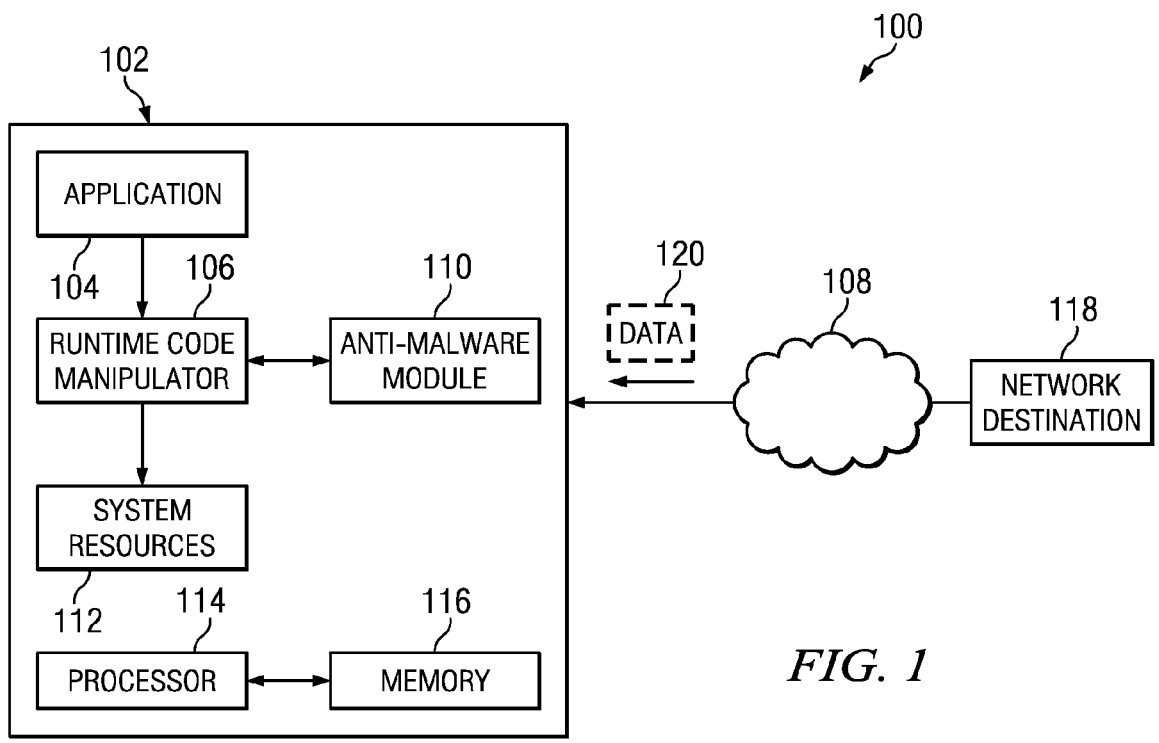
FIG. 1 is an illustration of an example system for application sandboxing using a dynamic optimization framework.

FIG. 1 is an illustration of an example system 100 for application sandboxing using a dynamic optimization framework. System 100 may be configured to execute application 104 in a secured manner to separate the execution of application 104 from the rest of electronic device 102. Such separation of execution may be known as a sandbox. System 100 may be configured to provide a secured set of resources for application 104 to execute such that any malicious actions of application 104 may be redirected, monitored, and recorded. System 100 may be configured to operate application 104 in a sandbox before allowing application 104 to run natively on electronic device 102. To execute application 104 in such a secure manner, system 100 may be configured to utilize a dynamic optimization framework including a runtime code manipulator 106 communicatively coupled to an anti-malware module 110. Runtime code manipulator 106 and anti-malware module 110 may be configured to intercept attempted execution of application 104, rewrite instructions accessing sensitive system resources 112, execute the rewritten executions to secured system resources 112, and determine whether the actions committed by application 104 are malicious.

Although application 104 is represented as an application, application 104 may include or be embodied by data, a file, process, executable, script, code, or shared library. Application 104 may be unknown or untested with regards to malware or may include unknown or untested code. For example, application 104 may be a stand-alone application whose malware status is unknown. In another example, application 104 may be a known application with data or code wherein the malware status of the data or code is unknown. These examples may include Microsoft® Word with an unverified word processing file, Adobe® Acrobat® with an unverified .PDF file, or a web browser with unverified, downloaded JavaScript. Malware may infect an electronic device by, for example, executing as a malicious application or by exploiting weaknesses in a known application. Malware may exploit weaknesses in a known application by causing the application to open, run, or execute a file or code embedded with instructions to exploit the weaknesses of the known application. Such malware attacks may include those exploiting stack, heap, or other buffer overruns or overflows.

Application 104 may include data 120 downloaded from a network destination 118 over a network 108. Data 120 may include, for example, code, files, applications, scripts, or other suitable entities. Network destination 118 may include a server, website, or other network entity accessible by application 104 or another entity on electronic device 102. Network destination 118 may contain malicious contents for a disguised download—in the form of data 120—by malicious agents on electronic device 102. For example, malware executing on electronic device 102 may contact network destination 118 to download additional content—in the form of data 120—to exploit the system resources 112 of electronic device 102. Network destination 118 may spoof legitimate data, pages, or other content that application 104 may attempt to access and may cause application 104 to download malicious applications, data, files, code, or other content—in the form of data 120—instead. For example, a web browser application on electronic device 102 may access network destination 118 for a seemingly legitimate website, but scripts downloaded as part of data 120 for execution in electronic device 102 may include malware.

Consequently, system 100 may be configured to execute application 104 using sandbox security techniques to avoid the execution of such malicious content. In one embodiment, system 100 may be configured to detect the download of data 120 from network destination 118 and execute such data 120 as application 104 using a dynamic optimization framework to determine whether application 104 is safe or not. In another embodiment, system 100 may be configured to detect the download of data 120 from network destination 118 and execute such content with application 104 using a dynamic optimization framework to determine whether the content is safe or not.

Although in FIG. 1 system 100 is illustrated utilizing runtime code manipulator 106 and anti-malware module 110 on electronic device 102, which may be the electronic device 102 that initiated download of data 120, the sandboxing operations conducted utilizing runtime code manipulator 106 and anti-malware module 110 may be conducted on a separate electronic device. For example, system 100 may include a gateway or network server configured to intercept the download of data 120. Further, runtime code manipulator 106 and anti-malware module 110 may be configured to operate on such a gateway or network server. Consequently, potentially malicious data 120 may be prevented from even entering a network in which the target electronic device 102 resides.

Network 108 may include any suitable network, series of networks, or portions thereof for communication between electronic device 102 and network destination 118. Such networks may include but are not limited to: the Internet, an intranet, wide-area-networks, local-area-networks, backhaul-networks, peer-to-peer-networks, or any combination thereof.

Runtime code manipulator 106 may be configured to intercept attempted execution of code or instructions from application 104 before such attempted execution is made on system resources 112. Runtime code manipulator may be configured to analyze such code or instructions to determine whether the instructions require modification. How to analyze given code or instructions and to subsequently modify the instructions may be determined by anti-malware module 110. For example, code or instructions accessing sensitive system resources 112 may be intercepted by runtime code manipulator 106, analyzed by referencing anti-malware module 110, determined to be accessing sensitive system resources 112, rewritten so as to access secured system resources 112, and subsequently executed on electronic device 102. In another example, code or instructions accessing non-sensitive system resources 112 may be intercepted by runtime code manipulator 106, analyzed by referencing anti-malware module 110, determined to be accessing non-sensitive system resources 112, preserved in the original form as accessing non-sensitive system resources 112, and subsequently executed on electronic device 102.

Runtime code manipulator 106 may be configured to determine whether to execute data 120 in a secured manner. Such determinations may be made by configuring runtime code manipulator 106 to access anti-malware module 110 for criteria of whether to execute data 120 in a secured manner. In one embodiment, runtime code manipulator 106 may be configured to execute data 120 in a secured manner if data 120 is unknown or malicious, application 104 is unknown or malicious, or if network destination 118 is unknown or malicious.

Runtime code manipulator 106 may be configured launch application 104 based on data 120. By launching application 104, runtime code manipulator 106 may be configured to intercept the attempted access of runtime code manipulator 106 of system resources 112.

Runtime code manipulator 106 may be configured to access anti-malware module 110 to determine how to rewrite intercepted code or instructions to redirect execution of code or instructions, runtime code manipulator 106. Access to anti-malware module 110 may be conducted by, for example, calling functions exposed by anti-malware module 110. Runtime code manipulator 106 may be configured to allow instructions or code—including those rewritten and those allowed to remain in their original state—to execute on system resources 112.

Runtime code manipulator 106 may be configured to rewrite code or instructions or to redirect execution of code or instructions, at the time of the attempted execution of such code or instructions. Thus, runtime code manipulator 106 may be configured to operate at runtime. In addition, runtime code manipulator 106 may be configured to allow the modification or redirection of code or instructions at any time during execution. Thus, runtime code manipulator 106 may be configured as a dynamic runtime code manipulator.

Anti-malware module 110 may be configured to determine what kinds of applications 104 or data 120 should be monitored by execution using sandboxing techniques. Such determinations may be provided to runtime code manipulator 106 to intercept particular code or instructions.

Given an intercepted instruction or code, anti-malware module 110 may be configured to determine whether the attempted execution represents an attempted access of system resources 112 that are sensitive. For example, instructions or code may be received to read or write or modify sensitive files, modify a registry, call system functions or access a system services dispatch table, read or write to the process of memory of another process, or load a kernel mode driver. In such examples, malware may be operating to maliciously harm or exploit the sensitive system resources described. If anti-malware module 110 determines that the attempted execution does not attempt to access sensitive resources or conduct malicious operations, then anti-malware module 110 may be configured to determine that the intercepted instruction or code does not need to be rewritten.

However, if anti-malware module 110 determines that the attempted execution does attempt to access a sensitive system resource, then anti-malware module 110 may be configured to determine how to rewrite the intercepted code or instruction. The intercepted code or instruction may be rewritten so as to execute on a secured resource. Execution on the secured resources may limit execution of application 104 and function as a sandboxing technique. The secured resource may include spoofed, dummy, or other resources configured to provide application 104 the appearance of execution of the desired instruction or code. Return values, parameters, or other information may be spoofed and returned to application 104. The execution and the effects of the execution may be recorded. For example, an attempted write may be redirected to a spoofed file. The attempted write may be recorded, as well as the values written to the spoofed file.

Anti-malware module 110 or other anti-malware software may be configured to analyze the effects of the attempted write and determine whether the attempted execution constitutes malicious behavior or nor. To make such a determination, anti-malware module 110 may be configured to, for example, consult behavioral analysis rules representing behaviors indicative of malware. Such rules may be developed by anti-malware researchers and provided locally to anti-malware module 110 or made available on an anti-malware server. For example, some sensitive operating system functions may normally only be called by other operating system functions. Access by a non-authorized function may be indicative of a malware attack. If application 104 attempts to execute such a function, even though the attempt was redirected to a spoofed function, anti-malware module 110 may be configured to analyze the executed attempt and determine that application 104 is malicious or executing malicious code. Anti-malware module 110 may be configured to determine malicious operations such as attempts to debug, terminate, write memory or inject code into another process, interact with various operating system services or subsystems such as network configuration, user configuration, service scheduling and management, or driver installation.

Intercepted and rewritten code determined by anti-malware module 110 to operate safely within the sandbox may be allowed to execute as originally configured by application 104. Anti-malware module 110 may be configured to analyze the full execution of application 104 and determine that no malicious threats are present before allowing the normal execution of application 104.

Runtime code manipulator 106 may be implemented by one or more processes, applications, scripts, executables, libraries, or other entities. Runtime code manipulator 106 may contain instructions for performing the functions described herein. The instructions may be stored in memory 116 for execution by processor 114. In one embodiment, runtime code manipulator 106 may be implementing using the DynamoRIO dynamic instrumentation tool platform.

Anti-malware module 110 may be implemented by one or more processes, applications, scripts, executables, libraries, or other entities. In one embodiment, anti-malware module 110 may be implemented by a shared library or dynamically-linked-library ("DLL"). In another embodiment, anti-malware module 110 may be incorporated into runtime code manipulator 106. Anti-malware module 110 may contain instructions for performing the functions described herein. The instructions may be stored in memory 116 for execution by processor 114.

Processor 114 may comprise, for example a microprocessor, microcontroller, digital signal processor (DSP), application specific integrated circuit (ASIC), or any other digital or analog circuitry configured to interpret and/or execute program instructions and/or process data. In some embodiments, processor 114 may interpret and/or execute program instructions and/or process data stored in memory 116. Memory 116 may be configured in part or whole as application memory, system memory, or both. Memory 116 may include any system, device, or apparatus configured to hold and/or house one or more memory modules. Each memory module may include any system, device or apparatus configured to retain program instructions and/or data for a period of time (e.g., computer-readable media).

As code or instructions of application 104 are rewritten or redirected by runtime code manipulator 106 and anti-malware module 110, application 104 itself may remain unchanged. In addition, sensitive underlying system resources 112 may remain unchanged.

Runtime code manipulator 106 and anti-malware module 110 may be configured to run in user mode on electronic device 102. Furthermore, runtime code manipulator 106 and anti-malware module 110 may be configured to run without reliance on drivers installed on electronic device 102 to specifically enable the functionality described herein. In addition, runtime code manipulator 106 and anti-malware module 110 may be configured to operate without specific hardware requirements on electronic device 102 and without specific virtualization features. By intercepting, analyzing, and modifying instructions at code level, runtime code manipulator 106 and anti-malware module 110 may be configured to sanitize instructions at a very low level. For example, runtime code manipulator 106 and anti-malware module 110 may be configured to identify low-level disk driver or raw disk writing instructions. Such low-level operations may be made without kernel mode hooks, user mode hooks, or callback functions registered in an operating system of electronic device 102. Consequently, execution of runtime code manipulator 106 and anti-malware module 110 may be compatible with rootkit or hooking prevention tools such as anti-malware products from McAfee, Inc. or Microsoft® Patch Guard®. Such products may otherwise deny access to sandboxing techniques requiring hooks. Execution of runtime code manipulator 106 and anti-malware module 110 may not require a full virtual machine to emulate or simulate electronic device 102. Consequently, execution of runtime code manipulator 106 and anti-malware module 110 may require a smaller system footprint than would otherwise be required.

In operation, anti-malware module 110 may be operating in conjunction with runtime code manipulator 106 to protect electronic device 102 from malicious operations. In one embodiment, anti-malware module 110 and runtime code manipulator 106 may be executing on electronic device 102. In another embodiment, anti-malware module 110 and runtime code manipulator 106 may be operating on a server to protect electronic device 102 from malicious operations.

An application 104 may attempt to access sensitive system resources 112 on electronic device 102. In one embodiment, application 104 may be downloaded from network destination 118 over network 108 in the form of data 120. In another embodiment, data 120 may be downloaded from network destination over network 108 for use with application 104. Anti-malware module 110 and runtime code manipulator 106 may run the execution of application 104 or application 104 with data 120 in a sandbox to isolate such execution from sensitive system resources 112.

Anti-malware module 110 and runtime code manipulator 106 may determine whether to execute application 104 in a sandbox through any suitable manner. For example, application 104 may be executed in a sandbox if application 104 or data 120 were downloaded from an untrusted or unknown network destination 118. Such a determination about network destination 118 may be made, for example, by accessing a reputation server. The malware status of network destination 118 may be malicious, known to be safe, or unknown. Application 104 may be executed in a sandbox if the malware status of network destination 104 is known to be malicious or is unknown. In another example, application 104 may be executed in a sandbox if the malware status of application 104 or data 120 is unknown or known to be malicious. In yet another example, application 104 may be executed in a sandbox if application 104 attempts to access sensitive system resources 112.

Runtime code manipulator 106 may launch application 104 and occupy the address space of application 104. Runtime code manipulator 106 may intercept attempted execution of code or instructions of application 104 directed at system resources 112. Runtime code manipulator 106 may access anti-malware module 110 to determine whether the attempted execution of code or instructions is targeted towards system resources 112 that are sensitive. If such sensitive resources are targeted, anti-malware module 110 may be accessed to determine how to rewrite the code or instructions to address system resources 112 that are safe. For example, portions of system resources 112 may be established as a sandbox memory. One or more entities targeted by application 104 may be spoofed such that application 104 is not aware that its attempts have been redirected.

Returned values or control transfers to application 104 from system resources 112 may be intercepted by runtime code manipulator 106. Such values may have been spoofed by elements of a sandbox in system resources 112. Runtime code manipulator may redirect control transfers so as to maintain control over the operation of application 104.

Anti-malware module 112 may analyze the operation as it has been segregated within system resources 112 in a sandbox. Anti-malware module 112 may determine whether the operation is indicative of a malware attack. If so, then application 104 may be cleaned, quarantined, or removed from electronic device 102.

Figure 2:
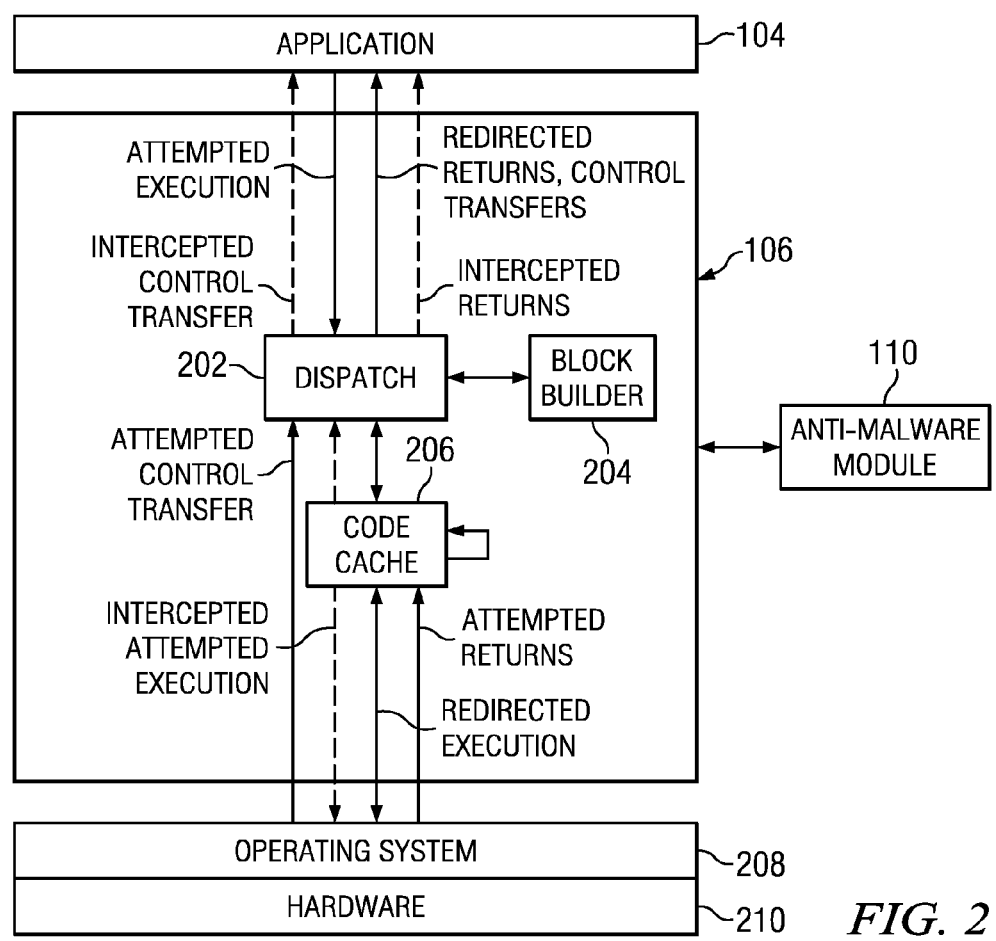
FIG. 2 is a more detailed illustration of the configuration and operation of a runtime code manipulator and an anti-malware module to intercept and rewrite code or instructions from application.

FIG. 2 is a more detailed illustration of the configuration and operation of runtime code manipulator 106 and anti-malware module 110 to intercept and rewrite code or instructions from application 104.

Runtime code manipulator 106 may include a dispatch module 202 communicatively coupled to a block builder 204 and a code cache 206. Dispatch module 202, block builder 204, and code cache 206 may be implemented as modules, functions, libraries, or any other suitable entity. Dispatch module 202 may be configured to intercept the attempted execution of the code or instruction from application 104. Dispatch module 202 may be configured to communicate the code or instruction to block builder 204. Block builder 204 may be configured to assemble code or instruction into a block. Individual instructions or segments of code may be assembled into basic blocks. Consecutive strings of instructions or segments of code, each assembled into basic blocks, may then be assembled into traces. Dispatch module 202 and/or block builder 204 may be communicatively coupled to anti-malware module 110 to determine whether a basic block or a string should be rewritten because the instructions or code contained therein are directed to sensitive system resources. A basic block or a string of code or instructions may represent a segment of code or instructions that operates sequentially without a branch point. A branch point may include an instruction or code wherein two or more possible choices of code segments may be executed next. Thus, runtime code manipulator 106 may select a branch point as a dividing line between different segments of code.

Once a basic block or trace has been assembled and possibly rewritten, it may be stored in code cache 206. The next time that the same code or instructions are intercepted by runtime code manipulator 106, dispatch module 202 may be configured to direct execution of the corresponding block or trace stored in code cache 206. Thus, a given sequence of code or instructions may only require analysis and rewrite once. This may speed the operation of system 100 when rewriting code in real time. Code cache 206 may be configured to send the appropriate analyzed and possibly rewritten instructions or code to the system resources. Code cache 206 may be configured to receive return information from the system resources. For example, code or instructions may be passed from code cache 206 to operating system 208, wherein the code or instructions may be applied to the operating system 208 or other entities operating on hardware 210. After attempting to execute a function, command, or system call, the operating system 208 may deliver the attempted execution to the destination and return the result of the operation.

In operation, application 104 may send an attempted execution of code or instructions to system resources such as operating system 208 or hardware 210. Runtime code manipulator 106 may intercept the attempted execution. Such an interception may be conducted by dispatch module 202. Dispatch module 202 may access block builder 204 to construct a basic block or trace from the intercepted code or instructions. If the intercepted code or instructions were previously received, a corresponding basic block or trace may have already been constructed and stored in code cache 206. In such a case, dispatch module 202 may cause the corresponding basic block or trace in code cache 206 to be forwarded to system resources. Block builder 204, dispatch module 202 and/or other portions of runtime code manipulator 106 may access anti-malware module 110 to determine whether and how to rewrite the received code or instructions. Block builder 204 may analyze contents of code cache 206 to determine whether existing contents of code cache 206 may be combined with the received and possibly rewritten code to form new traces. The resulting rewritten code or instructions may be constructed into corresponding basic blocks or traces and stored in code cache 206.

Rewritten instructions corresponding to intercepted code or instructions may be issued by code cache 206 as redirected execution to operating system 208 or other portions of electronic device 102. Subsequent execution of the rewritten instructions may cause return values to be attempted to be sent to application 104. Such return values may be intercepted by code cache 206. The return values 206 may be used to determine what portions of code cache 206 are to be executed next. The return values 206 may be modified or spoofed—if not already modified or spoofed by secured resources configured to provide sandbox secured operation of application 104—and returned to application 104.

System resources 208 may attempt to transfer control of execution to application 104. Such an attempt may be intercepted by, for example, dispatch module 202. The transfer of control may be modified so as to keep runtime code manipulator 106 in control of the execution of application 104. The modified or redirected control transfer may be sent to application 104.

Through use of code cache 206, system 100 may be configured to operate at close to native speed through reuse of already rewritten instructions without requiring subsequent repeated analysis and rewriting of the same instructions that were previously received from application 104.

Figure 3:
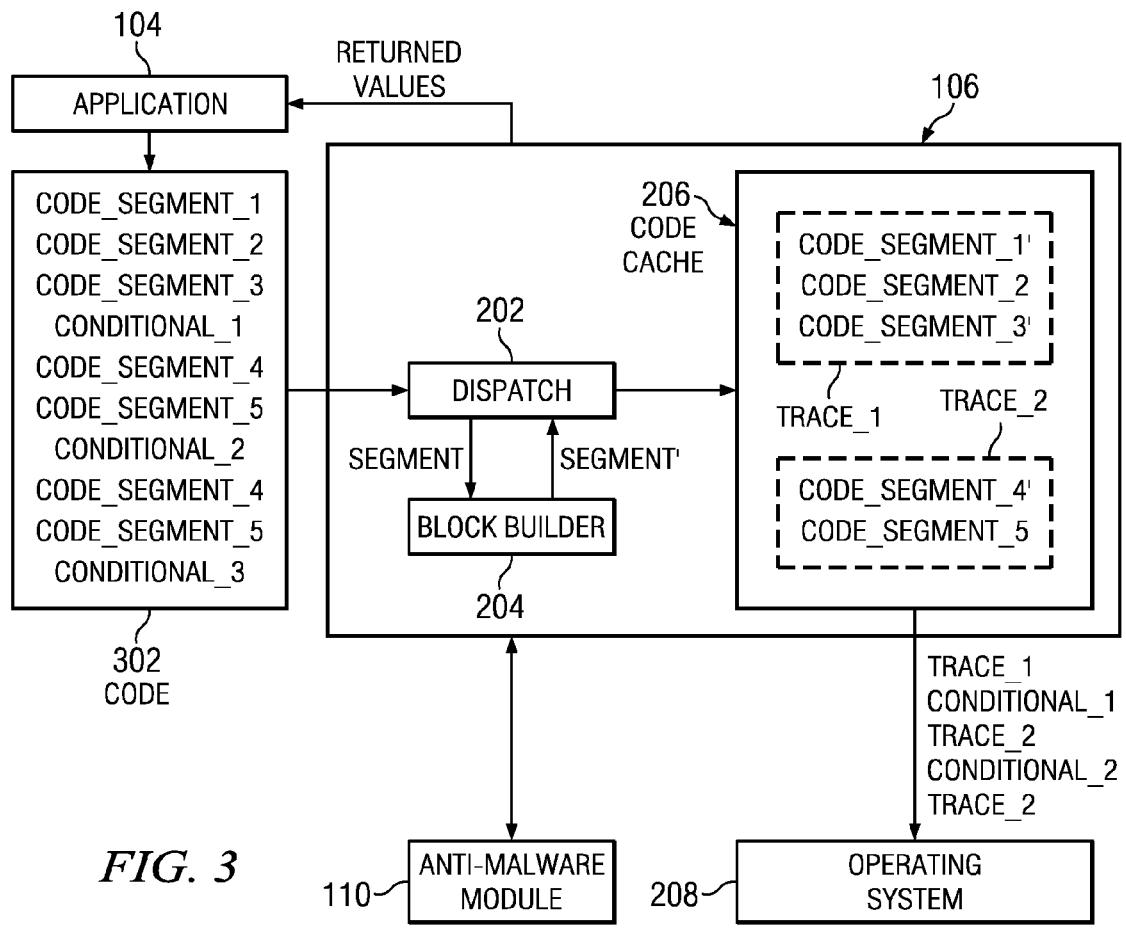
FIG. 3 is a more detailed illustration of the configuration and operation of a dispatch module, code cache, and anti-malware module to intercept and rewrite code or instructions from application.

FIG. 3 is a more detailed illustration of the configuration and operation of dispatch module 202, code cache 206 and anti-malware module 110 to intercept and rewrite code or instructions from application 104.

Code 302 may represent a sequence of instructions or code that application 104 attempts to execute. Code 302 may include, for example, a sequence of nine instructions sequentially attempted to be executed by application 104:

Code_segment_1
Code_segment_2
Code_segment_3
Conditional_1
Code_segment_4
Code_segment_5
Conditional_2
Code_segment_4
Code_segment_5
Conditional_3 wherein each "Code_segment_N" represents a one or more sequential instructions without a decision branch and each "Conditional_N" represents one or more instructions forming a decision branch within code 302. In one embodiment, the contents of code 302 issued by application 104 after a given "Conditional_N" may be sent based upon a return value received from execution.

For each such element of code 302, the element may be intercepted by dispatch 202. Dispatch module 202 may determine whether the element has already been submitted to code cache 206 and, if so, the element may be dispatched to operating system 208. Dispatch module 202 may determine whether the element may be combined with another element to comprise a trace in code cache 206. To make such a determination, dispatch module 202 may examine the next element in code 302. If the next element in code 302 does not contain a branch operation—such as a code fork, conditional, or similar operation—then the elements may be combined. If the next element in code 302 does contain such a branch operation, then the trace may be terminated and a new trace created starting with the branch operation. A combined trace may be dispatched to operating system 208.

If the element or a combination of the element and adjacent elements has not already been submitted to code cache 206, the element may be sent to block builder 204. Block builder 204 and/or dispatch module 202 may determine whether the element contains an attempted access of a sensitive resource. To make such a determination, dispatch module 202 and/or block builder 204 may access anti-malware module 110. Anti-malware module 110 may also provide information on how the element is to be rewritten so as to avoid accessing sensitive resources and instead access sandboxed or private resources. In one embodiment, anti-malware module 110 may rewrite the instructions in the element. The modified element may be returned to dispatch 202 and sent to code cache 206.

For example, Code_segment_1 may be received by dispatch 202. Block builder 204 and anti-malware module 110 may determine that Code_segment_1 contains instructions attempting to access a sensitive resource of electronic device 102. Thus, block builder 204 and anti-malware module 110 may modify the instructions of Code_segment_1 to access sandboxed resources instead. The modified element, represented as Code_segment_1', may be constructed as a basic block, returned to dispatch module 202, and added to code cache 206.

Code_segment_2 may be received by dispatch 202. Block builder 204 and anti-malware module 110 may determine that Code_segment_2 does not contain instructions attempting to access a sensitive resource of electronic device 102. Thus, block builder 204 and anti-malware module 110 may preserve the instructions of Code_segment_1 to access sandboxed resources instead. The element may be constructed as a basic block, returned to dispatch module 202, and added to code cache 206.

Code_segment_3 may be received by dispatch 202. Block builder 204 and anti-malware module 110 may determine that Code_segment_3 contains instructions attempting to access a sensitive resource of electronic device 102. Thus, block builder 204 and anti-malware module 110 may modify the instructions of Code_segment_3 to access sandboxed resources instead. The modified element, represented as Code_segment_3', may be constructed as a basic block, returned to dispatch module 202, and added to code cache 206.

Conditional_1 may be received by dispatch 202. Block builder 204 may recognize that the conditional interrupts the stream of sequential instructions received from application 104 beginning with Code_segment_1 and ending with Code_segment_3. Block builder 204 may form a trace, such as Trace_1, from the previously stored basic blocks corresponding to Code_segment_1', Code_segment_2, and Code_segment_3'. Trace_1 may be passed to operating system 208 for execution. Conditional_1 may be passed to operating system 208 for execution. A return value as a result of Conditional_1 may be received. The result of Conditional_1 may determine the next code to be executed. The result of Conditional_1 may be sent to application 104. Other return values corresponding to responses from Trace_1 or Conditional_1, which may have been spoofed, may be returned to application 104.

Code_segment_4 may be received by dispatch 202. Block builder 204 and anti-malware module 110 may determine that Code_segment_4 contains instructions attempting to access a sensitive resource of electronic device 102. Thus, block builder 204 and anti-malware module 110 may modify the instructions of Code_segment_4 to access sandboxed resources instead. The modified element, represented as Code_segment_4', may be constructed as a basic block, returned to dispatch module 202, and added to code cache 206.

Code_segment_5 may be received by dispatch 202. Block builder 204 and anti-malware module 110 may determine that Code_segment_2 does not contain instructions attempting to access a sensitive resource of electronic device 102. Thus, block builder 204 and anti-malware module 110 may preserve the instructions of Code_segment_5 to access sandboxed resources instead. The element may be constructed as a basic block, returned to dispatch module 202, and added to code cache 206.

Conditional_2 may be received by dispatch 202. Block builder 204 may recognize that the conditional interrupts the stream of sequential instructions received from application 104 beginning with Code_segment_4 and ending with Code_segment_5. Block builder 204 may form a trace, such as Trace_2, from the previously stored basic blocks corresponding to Code_segment_4' and Code_segment_5. Trace_2 may be passed to operating system 208 for execution. Conditional_2 may be passed to operating system 208 for execution.

Code_segment_4 may be received by dispatch 202. Block builder 204 or dispatch module 202 may determine that Code_segment_4 has already been analyzed, rewritten, and is stored in code cache 206. In one embodiment, Code_segment_4' may be issued to operating system 208 for execution. In another embodiment, dispatch module 202 may examine the next received code—Code_segment_5. Block builder 204 or dispatch module 202 may determine that Code_segment_5 has already been analyzed and is stored in code cache 206. Dispatch module 202 may examine the next received code—Conditional_3—and determine that the attempt to execute Code_segment_4' and Code_segment_5 corresponds to Trace_2. Trace_2 may be issued to operating system for execution.

Figure 4:
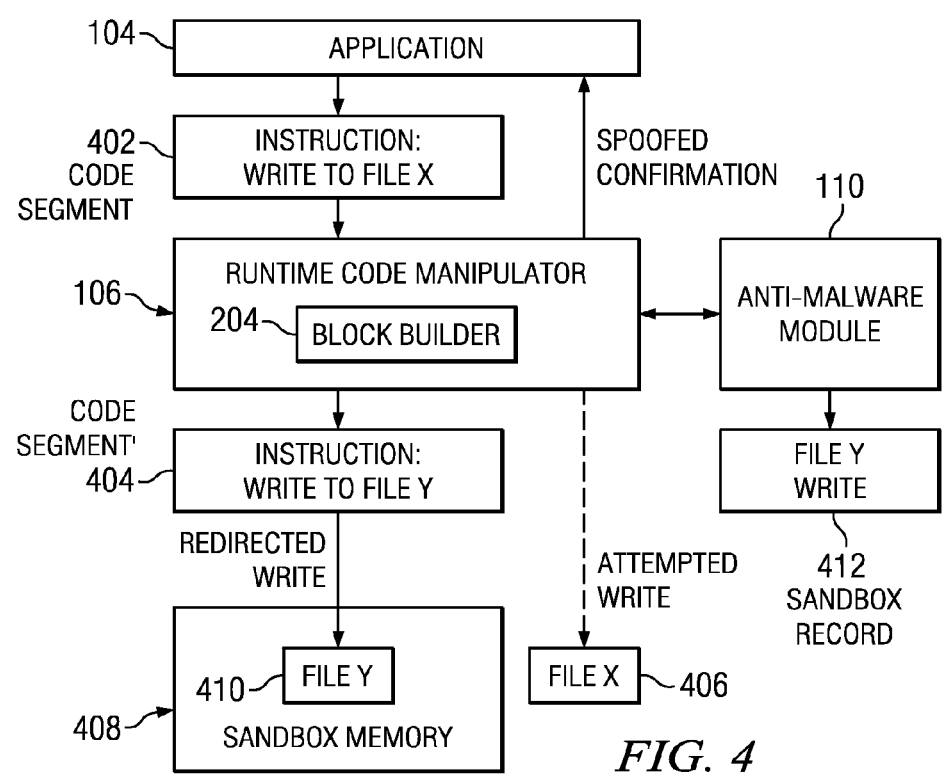
FIG. 4 is a more detailed illustration of the configuration and operation of an anti-malware module to rewrite instructions or code targeting a sensitive file on an electronic device.

FIG. 4 is a more detailed illustration of the configuration and operation of anti-malware module 110 to rewrite instructions or code targeting a sensitive file on electronic device 102. Electronic device 102 may include a file 406 whose existence or contents may be the subject of a malware attack on electronic device 102.

Application 104 may attempt to, for example, write to file "X" 406 using, for example, a code segment 402 with instructions to "Write To File X." The code segment 402 may be intercepted by runtime code manipulator 106. Runtime code manipulator 106 may access anti-malware module 110 to determine whether code segment 402 is an attempt to access sensitive system resources. If file "X" 406 is such a sensitive system resource, as defined by rules used by anti-malware module 110, anti-malware module 110 may determine that code segment 402 should be rewritten. Anti-malware module 110 may determine a sandbox resource such as a protected portion of memory, a spoofed file, or other such resource on which the instruction may be executed safely and its effects observed.

For example, anti-malware module 110 may determine that code segment 402 should be modified to target file "Y" 410. File "Y" 410 may be resident within sandbox memory 408, which may be secured so as to limit and observe the effects of the applied instruction without harming other portions of electronic device 102. The modification may result in code segment' 404, which may contain instructions to "Write to File Y." The modified instruction may be stored in a sandbox record 412. The effects of the modified write may be observed within sandbox memory 408 to determine whether the write yielded a malicious attempted attack on electronic device 102. Anti-malware module 110 or another suitable entity may be configured to analyze the results and compare them with, for example, anti-malware signatures, anti-malware reputation knowledge, or anti-malware behavioral rules. For example, if the contents written to file "Y" 410 would cause insertion of malware code into a word processing document, such an attempted execution is malicious.

If the attempted execution is determined to be malicious, anti-malware module 110 or another entity analyzing the results of the modified instruction may be configured to determine that application 104 is malicious, unsafe, or otherwise associated with malware. Application 104 and any associated portions of electronic device 102 may be cleaned, quarantined, or removed. Data associated with application 104 such as a signature of its process or file, or of the attempted change may be sent to an anti-malware server for further analysis.

Application 104 may receive no indication that the attempted write has been performed on file "Y" 410 rather than file "X" 406. Application 104 may receive an indication from runtime code manipulator 106 that the requested operation has been carried out as instructed.

Although a particular attempted write execution is shown, system 100 may be configured to intercept, modify, or spoof file operations such as read, write, delete, or create. Analysis of whether to intercept a given command or whether the attempted execution is malicious may be made on the basis of, for example, the identity of the file or the contents to be written to the file.

Figure 5:
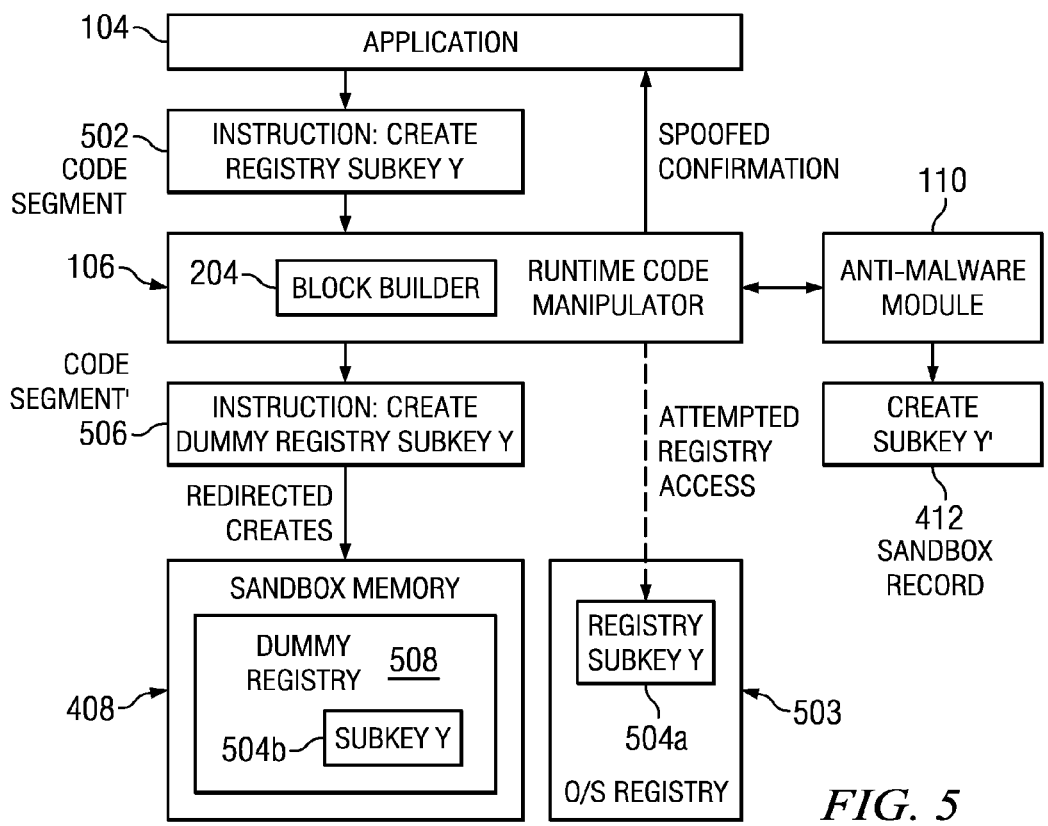
FIG. 5 is a more detailed illustration of the configuration and operation of an anti-malware module to rewrite instructions or code targeting a registry on an electronic device.

FIG. 5 is a more detailed illustration of the configuration and operation of anti-malware module 110 to rewrite instructions or code targeting a registry on electronic device 102. Electronic device 102 may include an operating system registry 503 whose contents may be the subject of a malware attack on electronic device 102. Operating system registry 503 may be configured to store settings for the operation of elements of electronic device 102 such as an operating system or individual applications.

Application 104 may attempt to, for example, access registry 503 to create a new subkey "Y" 504*a* under a category of applications using a code segment 502 with instructions to "Create Registry Subkey Y." The code segment 502 may be intercepted by runtime code manipulator 106. Runtime code manipulator 106 may access anti-malware module 110 to determine whether code segment 502 is an attempt to access sensitive system resources. Registry 503 may be such a sensitive system resource, as defined by rules used by anti-malware module 110, and consequently anti-malware module 110 may determine that code segment 502 should be rewritten. Anti-malware module 110 may determine a sandbox resource on which the instruction may be executed safely and its effects observed.

For example, anti-malware module 110 may determine that code segment 502 should be modified to target dummy registry 508. Dummy registry 508 may be structured as a normal registry of electronic device 102 but may be resident within a secure portion of electronic device 102 such as within sandbox memory 408. Dummy registry 508 may be configured to appear and respond as registry 503 to determine whether the attempted access of registry 503 would be malicious. The modification may result in code segment' 506, which may contain instructions to "Create dummy registry subkey Y." The modified instruction may be stored in sandbox record 412. Subkey "Y" 504*b*, identical to subkey "Y" 504*a*, may be created in dummy registry 508. The effects of the modified write may be observed within sandbox memory 408 to determine whether the registry change yielded a malicious attempted attack on electronic device 102. Anti-malware module 110 or another suitable entity may be configured to analyze the results. For example, if the subkey "Y" 504 created would cause a modification to a system service or application causing the execution of malware, such an attempted execution may be determined to be malicious.

Application 104 may receive no indication that the attempted access of registry has been performed on dummy registry 508 rather than registry 503. Application 104 may receive an indication from runtime code manipulator 106 that the requested operation has been carried out as instructed.

Although a particular attempted registry access is shown, system 100 may be configured to intercept, modify, or spoof registry operations such as read, write, delete, modify, or create. The operations may be made of, for example, a subkey or data within a subkey. Analysis of whether to intercept a given command or whether the attempted execution is malicious may be made on the basis of, for example, the identity or contents of the registry hierarchy where the attempt is made, the registry subkey, or the contents of the registry subkey.

Figure 6:
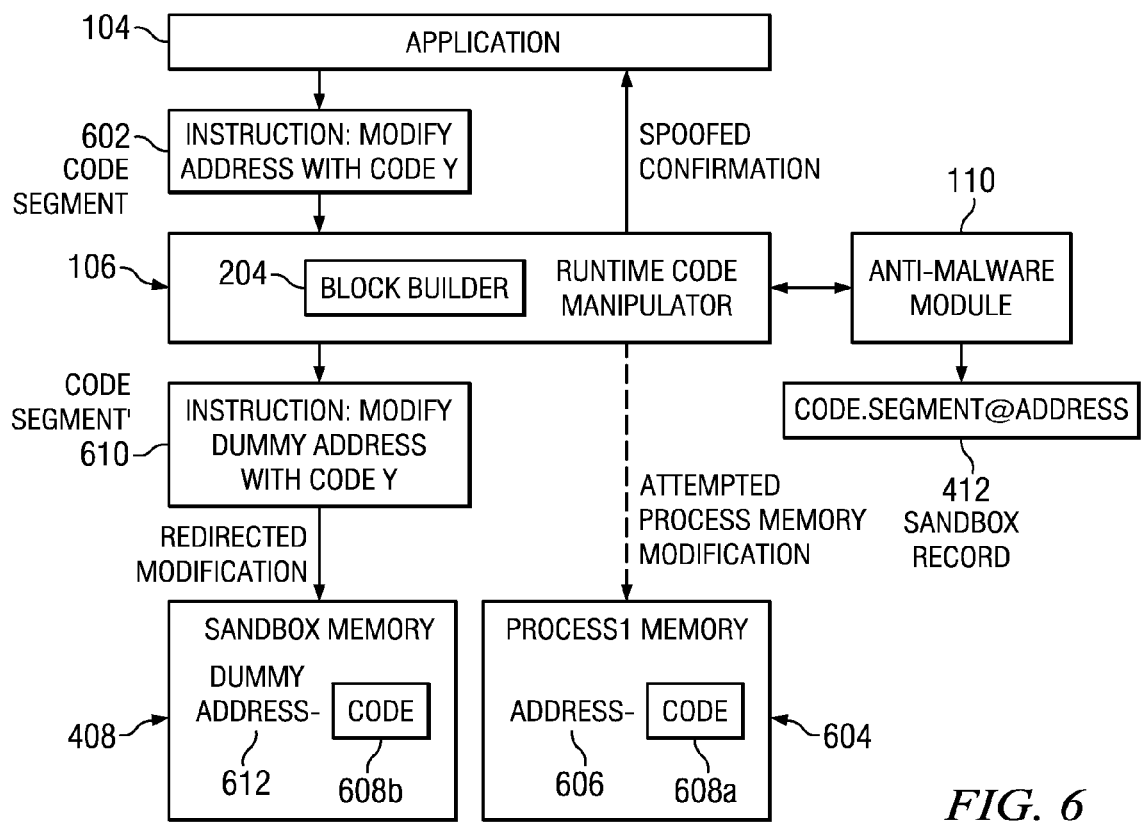
FIG. 6 is a more detailed illustration of the configuration and operation of an anti-malware module to rewrite instructions or code attempting a memory modification on an electronic device.

FIG. 6 is a more detailed illustration of the configuration and operation of anti-malware module 110 to rewrite instructions or code attempting a memory modification on electronic device 102. Electronic device 102 may include memory assigned to a particular process such as Process1 memory 604. The process associated with Process1 memory 604 may be the subject of a malware attack on electronic device 102. Process1 memory 604 may be configured to store data or code for the execution of a specific process. The process may include a sensitive, anti-malware, system or critical process which may be targeted by malware because of the necessary operation of the process. The process may include a process targeted because of a known exploitable weakness in the process.

Application 104 may attempt to, for example, modify Process1 memory 604 at a particular address 606 with code 608a. The code 608a may include malicious code. The attempt may include using a code segment 602 with instructions to "Modify address with code Y." The code segment 602 may be intercepted by runtime code manipulator 106. Runtime code manipulator 106 may access anti-malware module 110 to determine whether code segment 602 is an attempt to access sensitive system resources. Depending upon the source of the attempt, process1 memory 604 may be such a sensitive system resource, as defined by rules used by anti-malware module 110, and consequently anti-malware module 110 may determine that code segment 602 should be rewritten. Anti-malware module 110 may determine a sandbox resource on which the instruction may be executed safely and its effects observed.

For example, anti-malware module 110 may determine that code segment 602 should be modified to target a dummy address 612 in sandbox memory 408. Dummy address 612 may be configured to appear and respond as address 606, so that it may be determined whether the attempted access of address 606 would be malicious. The modification may result in code segment' 610, which may contain instructions to "Modify dummy address with code Y." The modified instruction may be stored in sandbox record 412. Code 608b, identical to code 608a, may be created at dummy address 612 in sandbox memory 408 instead of address 606 in Process1 memory 604. The effects of the modified write may be observed within sandbox memory 408 to determine whether the registry change yielded a malicious attempted attack on electronic device 102. Anti-malware module 110 or another suitable entity may be configured to analyze the results. For example, if execution if the code 608b would comprise an attack on the operating system of electronic device 102, such an attempted execution may be determined to be malicious.

Application 104 may receive no indication that the attempted access of registry has been performed on dummy address 612 in sandbox memory 408 rather than address 606 in process1 memory 604. Application 104 may receive an indication from runtime code manipulator 106 that the requested operation has been carried out as instructed.

Although a particular attempted memory modification is shown, system 100 may be configured to intercept, modify, or spoof memory operations such as read, write, copy, or delete. The operations may be made on specific portions of memory associated with a given process. Analysis of whether to intercept a given command or whether the attempted execution is malicious may be made on the basis of, for example, the identity of the owner of the memory, the memory mode, the address accessed within the memory, or the contents of the attempted modification.

Figure 7:
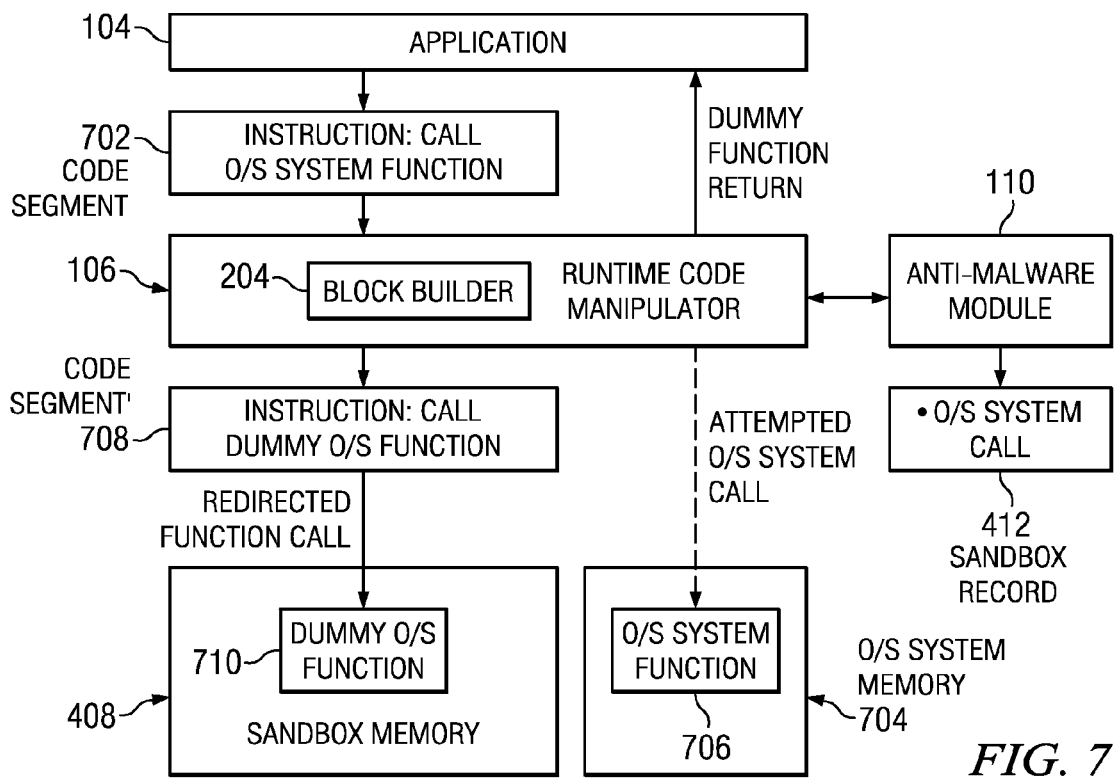
FIG. 7 is a more detailed illustration of the configuration and operation of an anti-malware module to rewrite instructions or code attempting to call an operating system function on an electronic device.

FIG. 7 is a more detailed illustration of the configuration and operation of anti-malware module 110 to rewrite instructions or code attempting to call an operating system function on electronic device 102. Electronic device 102 may include an operating system resident within operating system memory 704 and including one or more operating system functions 706. Such functions may be privileged, reserved, or control critical functions of the operating system of electronic device 102. Operating system function 706 may be the subject of a malware attack on electronic device 102. Operating system memory 704 may be configured to store data or code for the execution of operating system functions or processes. Operating system function 706 may be targeted by malware because of the ability of operating system function 706 to change the operation of electronic device 102.

Application 104 may attempt to, for example, execute operating system function 706. Operating system function 706 may be a sensitive or reserved function with ability to affect critical operation of electronic device 102. Execution of operating system function 706 by unauthorized entities may lead to malicious results. The attempt may include using a code segment 702 with instructions to "Call operating system function." The code segment 702 may be intercepted by runtime code manipulator 106. Runtime code manipulator 106 may access anti-malware module 110 to determine whether code segment 602 is an attempt to access sensitive system resources. Depending upon the source of the attempt, parameters used in the attempt, or the action caused by the attempt, execution of operating system function 706 may be an attempt to access a sensitive system resource, as defined by rules used by anti-malware module 110. Consequently anti-malware module 110 may determine that code segment 702 should be rewritten. Anti-malware module 110 may determine a sandbox resource on which the instruction may be executed safely and its effects observed.

For example, anti-malware module 110 may determine that code segment 702 should be modified to attempt to execute a spoofed operating system function such as dummy operating system function 710. Dummy operating system function 710 may be configured to appear and respond as operating system function 706, so that it may be determined whether the attempted access would be malicious. The modification may result in code segment' 708, which may contain instructions to "Call dummy operating system function." The modified instruction may be stored in sandbox record 412. Dummy operating system function 710 may be executed within sandbox memory 408. The effects of executing the function may be observed within sandbox memory 408 to determine whether the execution yielded a malicious attempted attack on electronic device 102. Anti-malware module 110 or another suitable entity may be configured to analyze the results. For example, if execution of dummy operating system function 710 resulted in disabling anti-malware software, such an attempted execution may be determined to be malicious.

Application 104 may receive no indication that the attempted execution of the operating system function has been performed as dummy operating system function 710 rather than operating system function 706. Application 104 may receive an indication from runtime code manipulator 106 that the requested operation has been carried out as instructed.

Although a particular attempted access of operating system functions are shown, system 100 may be configured to intercept, modify, or spoof any suitable system call. Analysis of whether to intercept a given function execution or whether the attempted execution is malicious may be made on the basis of, for example, the identity of the function, the mode of the function, parameters used to call the function, or a target entity of the function.

Figure 8:
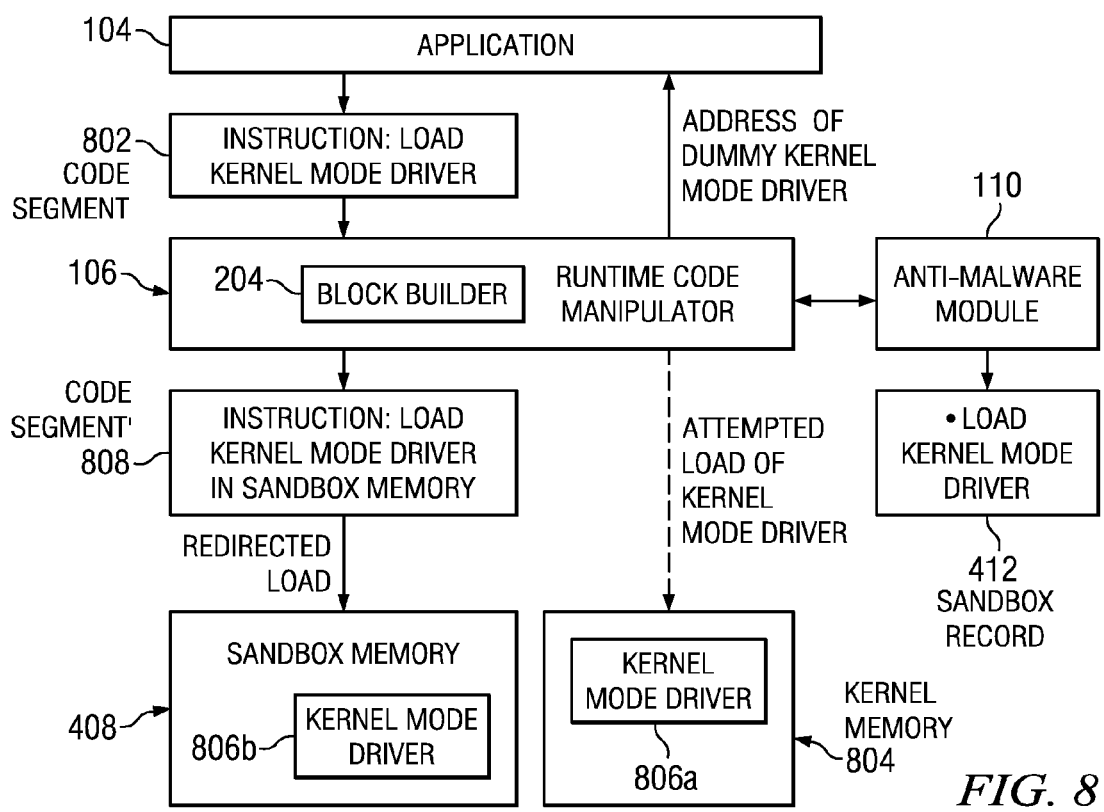
FIG. 8 is a more detailed illustration of the configuration and operation of anti-malware module to rewrite instructions or code attempting to load a kernel mode driver on an electronic device.

FIG. 8 is a more detailed illustration of the configuration and operation of anti-malware module 110 to rewrite instructions or code attempting to load a kernel mode driver on electronic device 102. Electronic device 102 may include reserved memory for crucial operating system actions such as kernel memory 804. A kernel mode driver 806 in kernel memory 804 may be the subject of a malware attack on electronic device 102. Kernel mode driver 806a may be configured to operate with privileged priority in electronic device 102. Kernel mode driver 806a may be used as part of a rootkit-based malware attack. The attempted loading of kernel mode driver 806a may include, for example, an attempt to exploit a known driver in a malicious manner or an attempt to load an unsafe or unknown driver.

Application 104 may attempt to, for example, load kernel mode driver 806a into kernel memory 804. In one embodiment, kernel mode driver 806a may have an unknown or untrusted malware status. Kernel mode driver 806a may include malicious code that, after loading, will run at a privileged priority in electronic device 102. The attempt may include using a code segment 802 with instructions to "Load kernel mode driver." The code segment 802 may be intercepted by runtime code manipulator 106. Runtime code manipulator 106 may access anti-malware module 110 to determine whether code segment 602 is an attempt to access sensitive system resources. Loading of an unknown kernel mode driver into kernel memory 804 or loading of a driver into kernel memory 804 by an unknown entity may be such an attempt, as defined by rules used by anti-malware module 110. Consequently, anti-malware module 110 may determine that code segment 802 should be rewritten. Anti-malware module 110 may determine a sandbox resource on which the instruction may be executed safely and its effects observed.

For example, anti-malware module 110 may determine that code segment 802 should be modified to load kernel mode driver 806b in sandbox memory 408. The loading of kernel mode driver 806b in sandbox memory 408 may be configured to appear and respond as the loading of kernel mode driver 806b in kernel memory 804, so that it may be determined whether the attempted access of address 606 would be malicious. The modification may result in code segment' 808, which may contain instructions to "Load kernel mode driver in sandbox memory." The effects of the loading of kernel mode driver 810b may be observed within sandbox memory 408 to determine whether the loaded kernel mode driver 810b yielded a malicious attempted attack on electronic device 102. Anti-malware module 110 or another suitable entity may be configured to analyze the results. For example, if loading of kernel mode driver 810 would be followed by an attack on the operating system of electronic device 102, such an attempted execution may be determined to be malicious.

Application 104 may receive no indication that the attempted loading of kernel mode driver 810b has been performed within sandbox memory 408 rather than in kernel memory 804. Application 104 may receive an indication from runtime code manipulator 106 that the requested operation has been carried out as instructed.

Although a particular driver operation is shown, system 100 may be configured to intercept, modify, or spoof driver operations such as load, unload, or execution. The operations may be made on specific portions of memory such as user mode memory or kernel mode memory. Analysis of whether to intercept a given driver operation or whether the attempted operation is malicious may be made on the basis of, for example, the identity of the loader of the driver, the area into which the driver is loaded, the identity of the driver, or subsequent execution of the driver.

Figure 9:
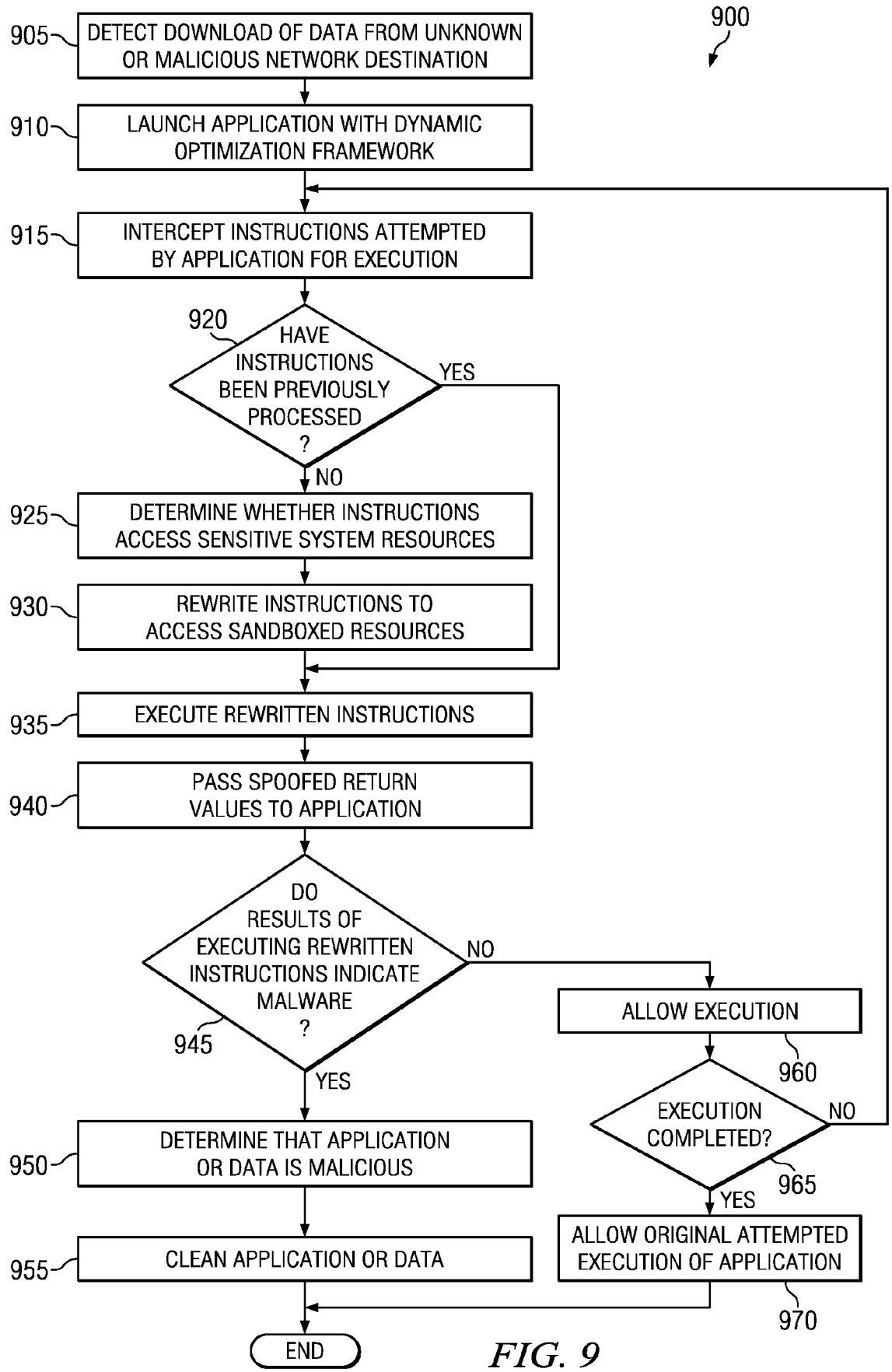
FIG. 9 is an illustration of an example embodiment of a method for providing application sandboxing using a dynamic optimization framework.

FIG. 9 is an illustration of an example embodiment of a method 900 for providing application sandboxing using a dynamic optimization framework.

In step 905, a download of data may be made from an unknown or malicious network destination. The data may include an application, such as an unknown or malicious application or data to be used by an application, such as a word processing file or a script for a web browser. In step 910, an application may be launched to use the data. For example, if the data includes an application, that application may be launched. In another application, an application for use with the downloaded data may be identified and launched. The application may be launched by the dynamic optimization framework to control the execution of the application. The application may be executed within a sandbox using the dynamic optimization framework.

In step 915, instructions or code issued by the application for execution may be intercepted. The instructions or code may include a code segment of consecutive instructions. The instructions or code may be divided into segments or traces by branch points.

In step 920, it may be determined whether the instructions or code have been previously processed during a prior execution of one or more steps of method 900. If the instructions have been previously processed, then the previously processed instructions may be retrieved and method 900 may proceed to step 935. If the instructions have not been previously processed, then in step 925 it may be determined whether the instructions are attempting to access sensitive system resources. Access of such system resources may include, for example, reading or writing sensitive system files, modifying the memory of other processes, loading a kernel mode driver, calling sensitive system functions, or accessing a registry subkey.

In step 930, the instructions may be rewritten to redirect attempted access of sensitive system resources to sandboxed resources. For example, attempted writes of files or registry keys may be redirected to spoofed files or registry keys. Attempted loading of unknown kernel mode drivers may be loaded in a sandbox memory. Attempted execution of a system function may be redirected to spoofed system functions. Attempted modifications of memory may be redirected to be conducted on sandboxed memory.

In step 935, the rewritten instructions may be executed by the electronic device upon which the application is executing. In step 940, return values or control transfers returning from the system resources may be passed to the application. The return values may be spoofed by the sandboxed resources or by the dynamic optimization framework. The control transfers may be first intercepted by the dynamic optimization framework to maintain control of the execution of the application.

In step 945, the results of executing the rewritten instructions may be observed to determine whether the results indicate that application or the data used in its execution are associated with malware. For example, if malicious code were written to a file or memory of a process, a malicious kernel mode driver were loaded, a system function to disable anti-malware software were executed, or a registry setting were written redirecting applications to a malicious website, then the application or the data used in its execution may be determined to be associated with malware.

If the results of executing the rewritten instructions do not indicate malware, then method 900 may proceed to step 960. If the results of executing the rewritten instructions indicate malware, then in step 950 it may be determined that the application or the data used by the application is malicious and is associated with malware. In step 955, the application or the data used by the application may be cleaned from the electronic device on which they were executed. The application or data may be, for example, removed, quarantined, or blocked from further download.

If the results of executing the rewritten instructions do not indicate malware, then in step 960 the execution of the instructions analyzed thus far may be allowed. In step 965, it may be determined whether the execution of the application has completed. If so, then in step 970 it may be determined that the application or the data used by the application are safe and execution of the application, in the original manner without rewritten instructions, may be allowed. In not, then the method 900 may return to step 915 to intercept a next set of code or instructions from the application.

Method 900 may be implemented using the system of FIGS. 1-8 or any other system operable to implement method 900. As such, the preferred initialization point for method 900 and the order of the steps comprising method 900 may depend on the implementation chosen. In some embodiments, some steps may be optionally omitted, repeated, or combined. In certain embodiments, method 900 may be implemented partially or fully in software embodied in computer-readable media.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, and other electromagnetic and/or optical carriers; and/or any combination of the foregoing.

Although the present disclosure has been described in detail, it should be understood that various changes, substitutions, and alterations can be made hereto without departing from the spirit and the scope of the disclosure as defined by the appended claims.

What is claimed is:

1. A computer-implemented method for preventing malware attacks, comprising:
    launching an application on an electronic device;
    intercepting one or more instructions from the application, the application attempting to execute the one or more instructions;
    determining whether the one or more instructions includes an attempt to access a sensitive system resource of the electronic device;
    rewriting the one or more instructions to access a secured system resource of the electronic device;
    executing the rewritten instructions on the electronic device;
    observing the results of the rewritten instructions;
    determining whether the results of rewritten instructions indicate an attempted malicious action; and
    based on the determination of the results, determining that the application is associated with malware.

2. The method of claim 1, wherein:
    intercepting the one or more instructions includes intercepting a first segment of instructions and a second segment of instructions; and
    determining whether the one or more instructions includes an attempt to access a sensitive system resource and rewriting the one or more instructions includes:
        determining whether the first segment includes an attempt to access a first sensitive system resource;
        based on such a determination, rewriting the first segment to access a first secured system resource;
        determining whether the second segment includes an attempt to access a second sensitive system resource; and
        based on such a determination, rewriting the second segment to access a second system resource.

3. The method of claim 1, wherein determining whether the instructions include an attempt to access a sensitive system resource comprises determining whether the attempt corresponds to a known method of malware attack on the electronic device.

4. The method of claim 1, wherein rewriting the instructions includes:
    rewriting a suspicious instruction accessing the sensitive system resource; and
    maintaining a non-suspicious instruction not accessing the sensitive system resource.

5. The method of claim 1, further comprising:
    determining whether the one or more instructions includes a repeat of the attempt to access the sensitive resource of the electronic device; and
    based on such a determination, executing the rewritten instructions without repeating the rewrite of the one or more instructions.

6. The method of claim 1, wherein:
    the sensitive system resource includes a registry; and
    rewriting the one or more instructions includes rewriting the instructions to access a spoofed registry.

7. The method of claim 1, wherein:
    the sensitive system resource includes a file; and
    rewriting the one or more instructions includes rewriting the instructions to access a spoofed file.

8. The method of claim 1, wherein:
    the sensitive system resource includes an address in memory; and
    rewriting the one or more instructions includes rewriting the instructions to access a spoofed address in memory.

9. The method of claim 1, wherein
    the sensitive system resource includes an operating system function; and
    rewriting the one or more instructions includes rewriting the instructions to access a spoofed operating system function.

10. The method of claim 1, wherein:
    the sensitive system resource includes a driver; and
    rewriting the one or more instructions includes rewriting the instructions to load a spoofed driver.

11. An article of manufacture, comprising:
    a non-transitory computer readable medium; and
    computer-executable instructions carried on the non-transitory computer readable medium, the instructions readable by a processor, the instructions, when read and executed, for causing the processor to:
        launch an application on an electronic device;
        intercept one or more instructions from the application, the application attempting to execute the one or more instructions;
        determine whether the one or more instructions includes an attempt to access a sensitive system resource of the electronic device;

rewrite the one or more instructions to access a secured system resource of the electronic device;
execute the rewritten instructions on the electronic device;
observe the results of the rewritten instructions;
determine whether the results of rewritten instructions indicate an attempted malicious action; and
based on the determination of the results, determine that the application is associated with malware.

12. The article of claim 11, wherein:
intercepting the one or more instructions includes intercepting a first segment of instructions and a second segment of instructions; and
determining whether the one or more instructions includes an attempt to access a sensitive system resource and rewriting the one or more instructions includes:
 determining whether the first segment includes an attempt to access a first sensitive system resource;
 based on such a determination, rewriting the first segment to access a first secured system resource;
 determining whether the second segment includes an attempt to access a second sensitive system resource; and
 based on such a determination, rewriting the second segment to access a second system resource.

13. The article of claim 11, wherein determining whether the instructions include an attempt to access a sensitive system resource comprises determining whether the attempt corresponds to a known method of malware attack on the electronic device.

14. The article of claim 11, wherein causing the processor to rewrite the instructions includes causing the processor to:
 rewrite a suspicious instruction accessing the sensitive system resource; and
 maintain a non-suspicious instruction not accessing the sensitive system resource.

15. The article of claim 11, wherein:
the sensitive system resource includes a registry; and
rewriting the one or more instructions includes rewriting the instructions to access a spoofed registry.

16. The article of claim 11, wherein:
the sensitive system resource includes a file; and
rewriting the one or more instructions includes rewriting the instructions to access a spoofed file.

17. The article of claim 11, wherein:
the sensitive system resource includes an address in memory; and
rewriting the one or more instructions includes rewriting the instructions to access a spoofed address in memory.

18. The article of claim 11, wherein
the sensitive system resource includes an operating system function; and
rewriting the one or more instructions includes rewriting the instructions to access a spoofed operating system function.

19. The article of claim 11, wherein:
the sensitive system resource includes a driver; and
rewriting the one or more instructions includes rewriting the instructions to load a spoofed driver.

20. A system for preventing malware attacks, comprising:
a processor coupled to a memory; and
a dynamic optimization framework executed by the processor, resident within the memory, the framework configured to:
 launch an application on an electronic device;
 intercept one or more instructions from the application, the application attempting to execute the one or more instructions;
 determine whether the one or more instructions includes an attempt to access a sensitive system resource of the electronic device;
 rewrite the one or more instructions to access a secured system resource of the electronic device;
 execute the rewritten instructions on the electronic device;
 observe the results of the rewritten instructions;
 determine whether the results of rewritten instructions indicate an attempted malicious action; and
 based on the determination of the results, determine that the application is associated with malware.

21. The system of claim 20, wherein: intercepting the one or more instructions includes intercepting a first segment of instructions and a second segment of instructions; and
determining whether the one or more instructions includes an attempt to access a sensitive system resource and rewriting the one or more instructions includes:
 determining whether the first segment includes an attempt to access a first sensitive system resource;
 based on such a determination, rewriting the first segment to access a first secured system resource;
 determining whether the second segment includes an attempt to access a second sensitive system resource; and
 based on such a determination, rewriting the second segment to access a second system resource.

22. The system of claim 20, wherein determining whether the instructions include an attempt to access a sensitive system resource comprises determining whether the attempt corresponds to a known method of malware attack on the electronic device.

23. The system of claim 20, wherein configuring the framework to rewrite the instructions includes configuring the framework to:
 rewrite a suspicious instruction accessing the sensitive system resource; and
 maintain a non-suspicious instruction not accessing the sensitive system resource.

24. The system of claim 20, wherein:
the sensitive system resource includes a registry; and
rewriting the one or more instructions includes rewriting the instructions to access a spoofed registry.

25. The system of claim 20, wherein:
the sensitive system resource includes a file; and
rewriting the one or more instructions includes rewriting the instructions to access a spoofed file.

26. The system of claim 20, wherein:
the sensitive system resource includes an address in memory; and
rewriting the one or more instructions includes rewriting the instructions to access a spoofed address in memory.

27. The system of claim 20, wherein
the sensitive system resource includes an operating system function; and
rewriting the one or more instructions includes rewriting the instructions to access a spoofed operating system function.

28. The system of claim 20, wherein:
the sensitive system resource includes a driver; and
rewriting the one or more instructions includes rewriting the instructions to load a spoofed driver.

* * * * *